Jan. 21, 1969 W. R. PRATT 3,423,731

SCANNER AND RESOLVER COMBINATION

Filed May 13, 1965 Sheet 1 of 3

INVENTOR

WARREN R. PRATT

BY Cushman, Darby & Cushman

ATTORNEYS

SCANNER AND RESOLVER COMBINATION

INVENTOR

WARREN R. PRATT

BY Cushman, Darby & Cushman

ATTORNEYS

Jan. 21, 1969 W. R. PRATT 3,423,731
SCANNER AND RESOLVER COMBINATION
Filed May 13, 1965 Sheet 3 of 3

N^TH SCANNER STATE RESOLVER SCHEMATIC

MEMORY CLEAR INPUT IS ASSUMED AT ZERO LEVEL

INVENTOR
WARREN R. PRATT
BY Cushman, Darby & Cushman
ATTORNEYS

United States Patent Office 3,423,731

Patented Jan. 21, 1969

3,423,731
SCANNER AND RESOLVER COMBINATION

Warren R. Pratt, White Bear Lake, Minn., assignor to Control Data Corporation, Minneapolis, Minn., a corporation of Minnesota Filed May 13, 1965, Ser. No. 455,577

U.S. Cl. 340—147 7 Claims

Int. Cl. H04q 3/00; H03k 17/02

ABSTRACT OF THE DISCLOSURE

A scanner and resolver combination for connecting one of a plurality of remote stations to a storage module in response to a storage access request signal wherein said combination includes a plurality of flip-flop circuits having cross-coupled feedback connections for free running operation and wherein a plurality of storage access request signals are adapted to be applied to the flip-flops to stop the free running operation thereof and to result in the connection of a remote station to a storage module.

Figure 1:
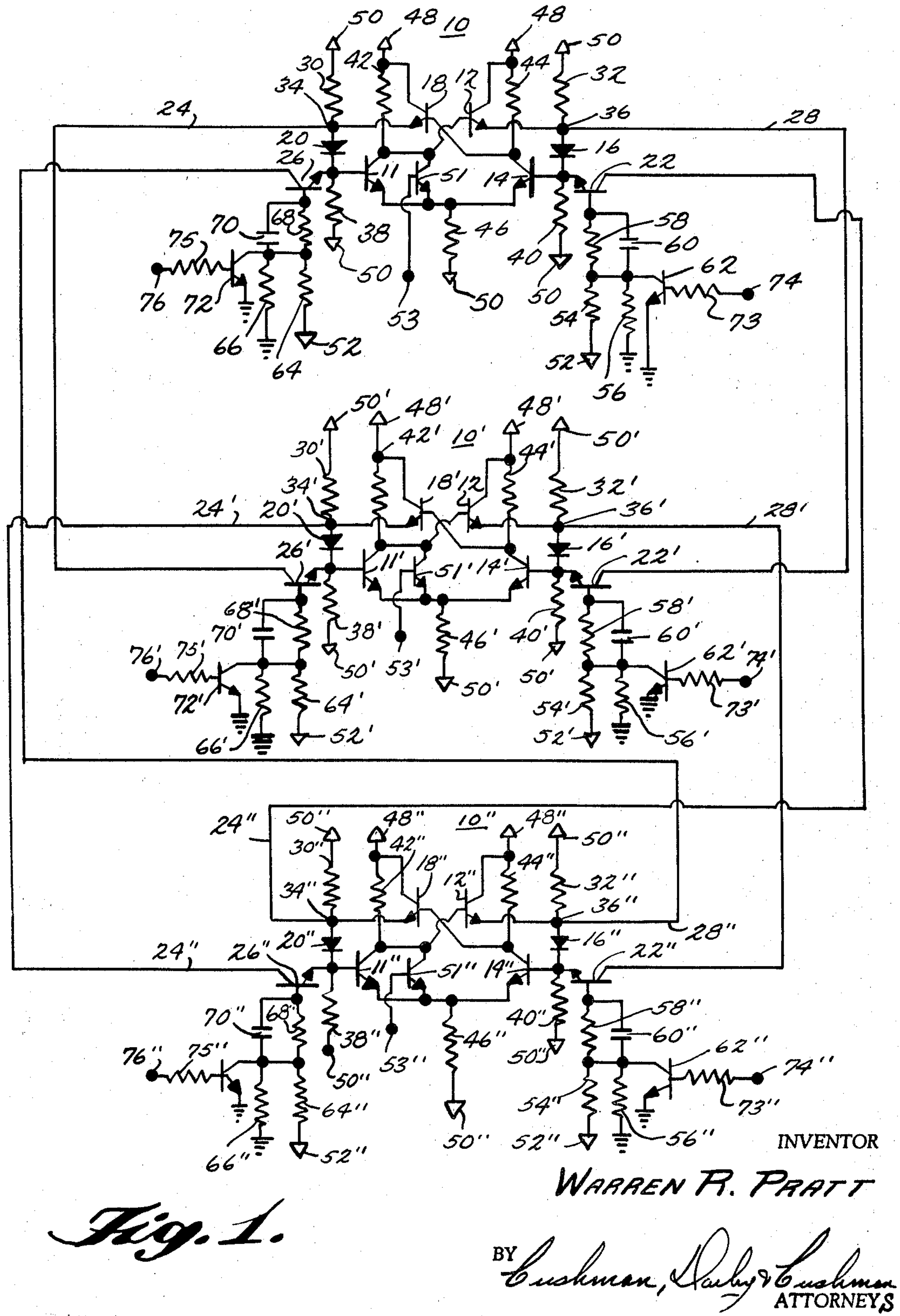

This invention relates in general to scanner and resolver combinations which are typically used in computer systems to determine which one of a plurality of remote stations should be connected to a storage module and in particular to improvements in these scanner and resolver combinations which result in simpler configurations and faster operation.

Heretofore, scanners have involved fairly complex circuitry to insure that a storage access request from a remote station is processed within a predetermined minimum of time, generally certain types of speed-up circuitry must be associated with the scanner to insure that all storage access requests are satisfied within this predetermined amount of time. Because of the complexity of prior scanner and resolver combinations, the cost of these circuits and amount of time required for checkout of these circuits has been unduly great.

Accordingly, it is an object of this invention to provide a simplified scanner circuit which can honor every single storage access request made to it within a very short period of time, thereby obviating the necessity of speed-up circuitry.

It is another object of this invention to provide simplified means within the scanner circuitry to insure that the resolver unambiguously decides which remote station the scanner determined should be connected to the storage module.

It is another object of the invention to provide simplified means within the scanner circuitry for halting the scanner in response to a memory access request from a remote station.

It is a further object of the invention to provide a simplified high speed scanner and resolver combination for determining which of a plurality of remote stations should be connected to a storage module.

It is a further object of the invention to provide means for resetting the scanner to a preferred state corresponding to a preferred remote station after the scanner has processed a storage access request from any one of the remote stations.

It is a further object of this invention to provide a simplified means for resolving which remote station the scanner determined should be connected to a storage module.

It is a further object of this invention to provide means for responding to the request from remote stations in a predetermined sequence.

Generally, the purpose of the scanner and resolver combination is to determine that an Nth remote station of M remote stations should be connected to a storage module in response to a storage access request signal from the Nth remote station. Accordingly, there is provided scanner means which may exist in M different states, each state respectively corresponding to one of the remote stations. Each remote station has a number associated with it—for example, the first station is 0, the second station is 1, and so forth to the Mth station. The scanner means comprises $M/2$ flip-flop circuits interconnected for free running operation where each flip-flop has two invertors with cross-coupled feedback connections and two outputs. Thus, scanner means has M outputs.

The scanner cycles consecutively through its states and recycles each time the Mth state is reached. Whenever the Nth remote station makes a request to access the storage module, it will transmit a storage access request signal to the scanner which causes the scanner to halt at the Nth state. Resolving means are connected to all of the outputs of the scanner to resolve which remote station halted the scanner. The outputs of the N and the $$N+\frac{M}{2}-1$$

states are applied to an AND circuit included in the resolving means. These two outputs are sufficient to uniquely determine the state of the resolver after it has halted. If $$N+\frac{M}{2}-1$$

is greater than M, this corresponds to the $$N+\frac{M}{2}-1-M$$

state.

Unidirectional current means are also incorporated in the cross-coupled feedback connections of the flip-flops to insure that when the scanner means is halted, the status of the scanner can be unambiguously resolved by the resolving means. Further, a single transistor AND means is incorporated into the scanner means to simplify scanner means halting when so required. Means are also provided for resetting of the scanner means after a given storage access request has been processed, if desired.

Figure 3:
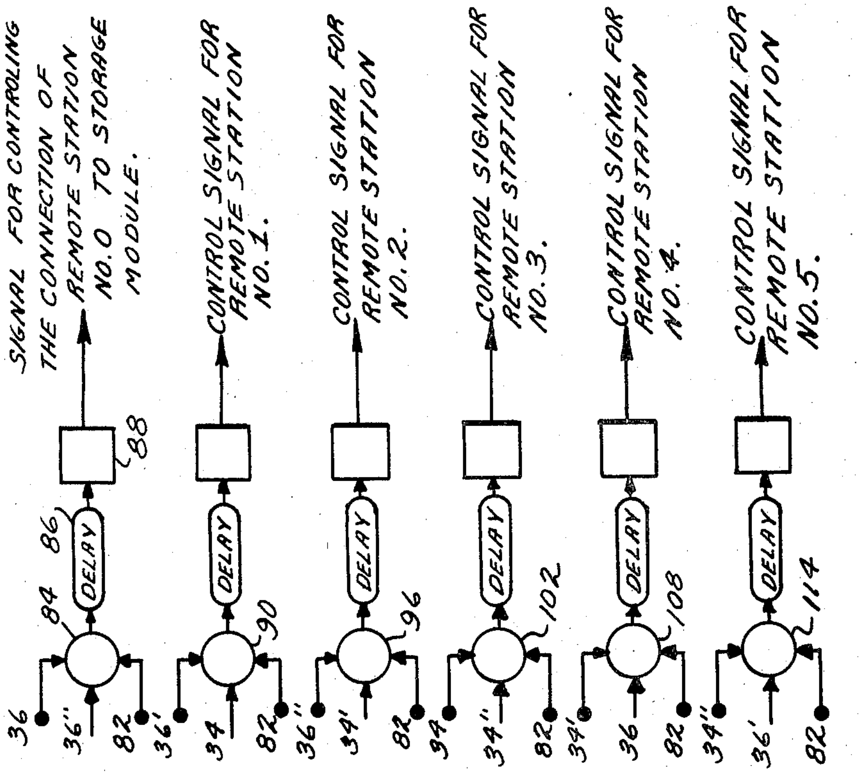
Figure 2:
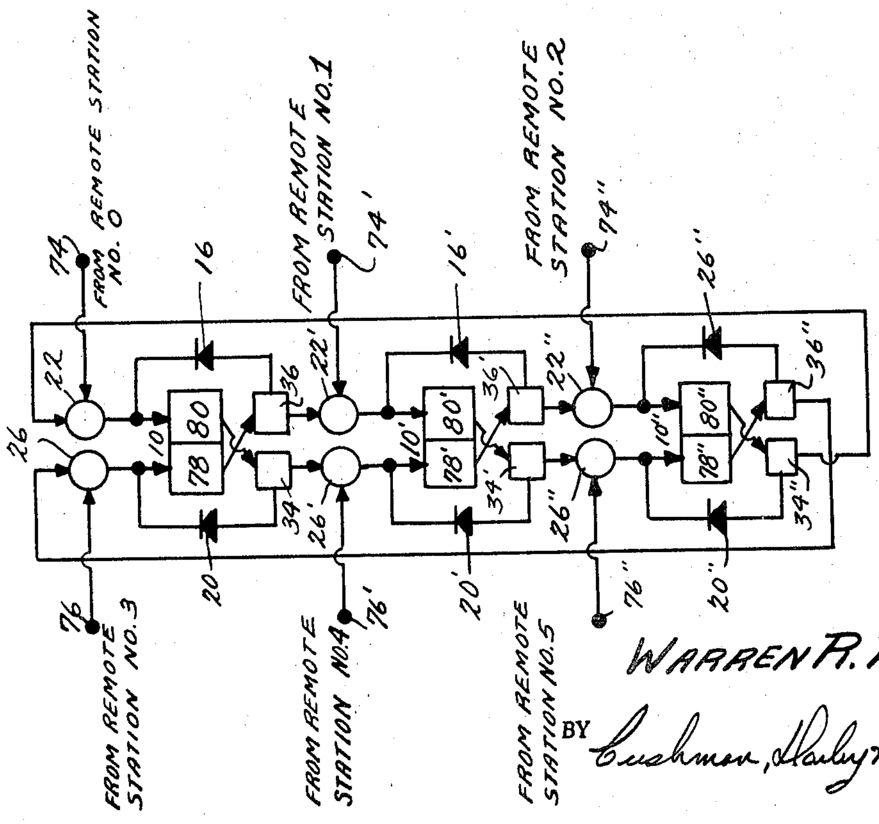
Figure 4:
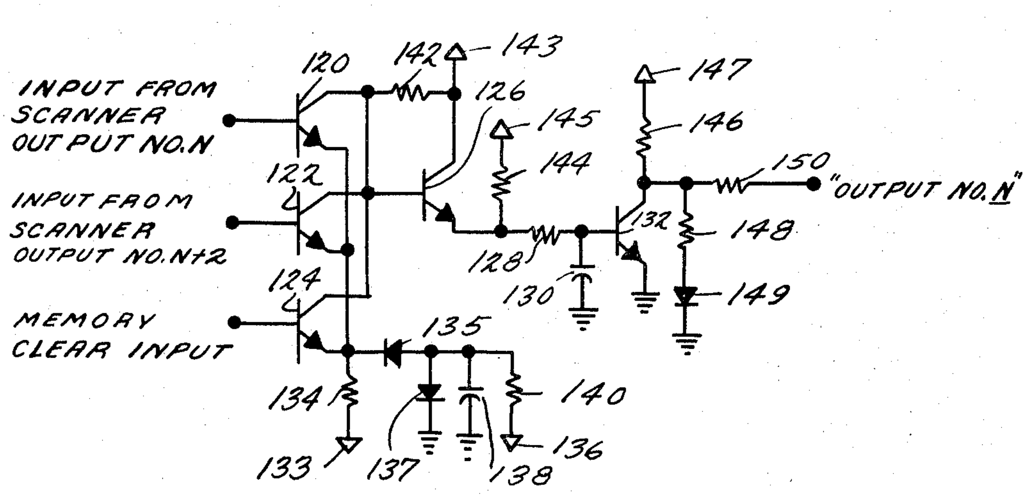
Figure 5:
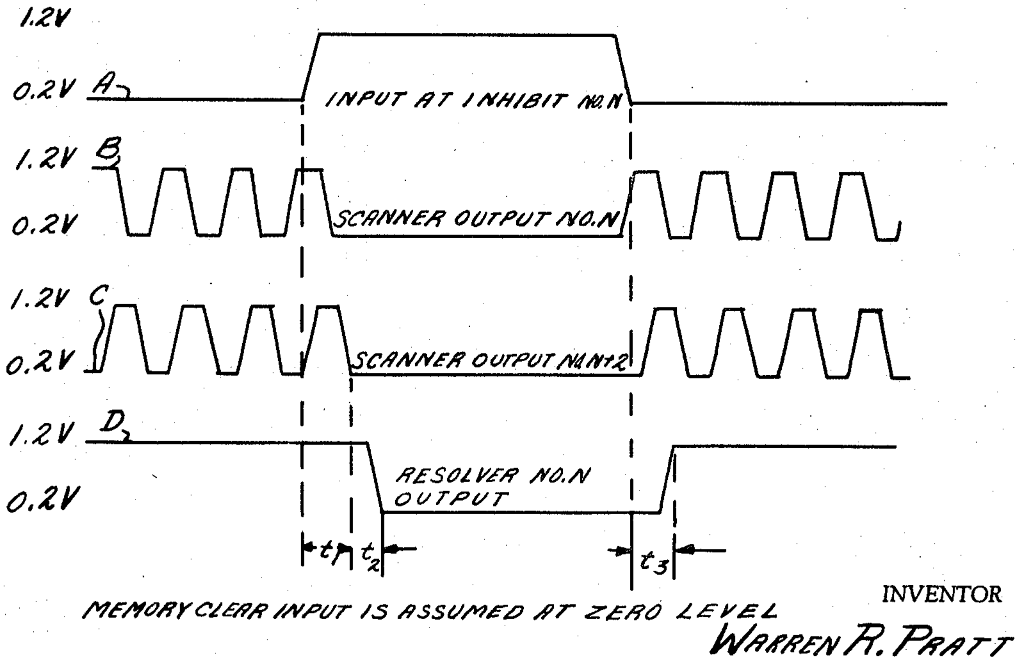

Other objects and advantages of the invention will become apparent from the following detailed description, appended claims and drawing, the accompanying figures of which are:

FIGURE 1, which is a schematic of the scanner circuitry of the preferred embodiment of the invention, FIGURE 2, which is a logic diagram of the scanner, FIGURE 3, which is a logic diagram of the resolver circuits with connections shown to the logic diagram of FIGURE 2, FIGURE 4, which is a detailed schematic of the preferred embodiment of the resolver of the invention and FIGURE 5, which shows the wave forms associated with the combined logic diagrams of FIGURES 2 and 3

In order to understand the free running operation of the scanner, reference should now be made to FIGURE 1 which shows three flip-flops 10, 10′, 10″ interconnected for free running operation. Each of the flip-flops is identical in construction and operation and all voltages are illustrative and given to aid in the comprehension of the following circuitry. Further, although NPN transistors are shown throughout the drawing, PNP transistors may be used if desired.

Assume that transistor or invertor means 11 is conducting. The voltage at the base of transistor 12 will be 1 volt. The voltage at the emitter of transistor 12 will be 0.8 volt less, or 0.2 volt. The voltage on the base of transistor or invertor means 14 will be 0.6 volt less than the voltage in the emitter of transistor 12, or —0.

volt. This is due to the voltage drop in diode or unidirectional current means 16 in the feedback path from transistor 11 to the base of transistor 14. Transistor 14 will be off. The voltage at the collector of transistor 14 will be 2 volts and therefore the voltage on the emitter of transistor 18 will be 0.8 volt less, or 1.2 volts. This is due to the voltage drop across the emitter junction of transistor 18. The voltage at the base of transistor 11 will be 0.6 volt less due to the drop across diode or unidirectional current means 20 than at the emitter of transistor 18. The voltage at the emitters of transistor 10 and 14 will be 0.8 volt less than the most positive of the voltages on the bases of transistors 11 and 14 or −0.2 volt. Hence, transistor 11 is held on and transistor 14 is held off.

This state remains until a voltage greater than the voltage on the base of transistor 11 is placed on the base of transistor 14. If an input of +1.2 volts were applied to the collector of transistor 22 and if transistor 22 were turned on, then a voltage of 1 volt would be placed on the base of transistor 14 since the voltage drop across transistor 22 is only 0.2 volt. The voltage of 1 volt on the base of transistor 14 would be sufficient to turn the transistor 14 on, thereby switching the flip-flop to its alternate condition.

Assuming that transistor 11 is on, +1.2 volts on the emitter of transistor 18 is applied through output line 24 to the collector of transistor 26'. The circuitry associated wtih transistor 26' is identical to that associated with transistor 22 and therefore, assuming that transistor 26' is on, 1 volt will be placed on the base of transistor 11', thereby turning it on. The action that will take place in flip-flop 10' will be the same as that for flip-flop 10 and therefore a +1.2 volts will appear on the output line 24' from the emitter of transistor 18'. This +1.2 volts will be applied to the collector of transistor 26'' which acts the same as transistor 26', assuming that it is on. At the emitter of transistor 18'' therefore, a +1.2 volts will be applied to the collector of transistor 22, which is assumed to be turned on.

As noted before, whenever transistor 22 has a +1.2 volts on its collector, it will turn transistor 14 on. This switches flip-flop 10 to its alternate condition and causes a +1.2 volts to occur at the emitter of transistor 12, which is transferred over output line 28 to the collector of transistor 22', thereby switching flip-flop 10' to its alternate condition and causing a +1.2 volts to occur at the emitter of transistor 12''. This voltage is transmitted over line 28'' to the collector of transistor 26, thereby returning flip-flop 10 to its original condition. As can be seen from the foregoing discussion, the interconnections of the flip-flops 10, 10' and 10'' are such as to maintain the scanner in a free running condition.

Load resistors 30 and 32 are provided at the output terminals 34 and 36 and biasing resistors 38, 40, 42, 44 and 46 are provided to supply the proper biasing voltage from the DC supply sources 48 and 50. The supply source 48 is typically +2.1 volts and the supply source 50 is typically −6 volts.

Reset transistors 51, 51' and 51'' having base control terminals 53, 53' and 53'' may be provided to reset the scanner to a preferred state, which will be described in detail hereinafter.

In order to understand how the scanner is halted upon receiving a request for access to the storage module, reference should now be made to the transistor or single transistor AND means 22 and its associated circuitry which includes DC supply source 52, biasing resistors 54, 56 and 58, bypass condenser 60 and transistor switch or invertor driver 62. The corresponding circuitry for transistor 26 which operates in the same way as the circuitry associated with transistor 22 is supply source 52, biasing resistors 64, 66 and 68, bypass condenser 70 and switching transistor or invertor driver 72.

Assume that transistor 62 is turned off. This means that there will be a current path through resistor 54 and resistor 56, which will develop a positive voltage on the base of transistor 22, thereby rendering it conductive. As long as all of the transistors 22, 22', 22'', 26, 26' and 26'' are conducting, the scanner will continue to run or oscillate until an inhibiting voltage is placed on one of the inhibiting inputs 74, 74', 74'', 76, 76', 76''.

Generally, the concept of a single transistor to perform the logical AND operation can be extended to other elements which have an input terminal, an output terminal and a control terminal, which regulates the current flowing through the element. Of course, the element must have an output signal occur whenever input signals are present coincidently on the control and input terminals of the element. An example of such an element might be an electronic tube where the grid and the plate would be the input terminals and the cathode would be the output terminal.

Whenever a remote station requests access to the storage module, a requesting signal will be transmitted from the remote station to an inhibiting terminal which corresponds to the remote station. For example, assume inhibiting terminal 74 is associated with remote station No. 0. The inhibiting or storage access request signal will be a positive pulse which will turn transistor 62 on, thereby providing a current path from 6 volts supply 52 through resistor 54 and transistor 62 to ground. This will decrease the voltage on the base of transistor 22, thereby cutting it off.

Note that transistor 22 acts as a single transistor AND means, that is, before a +1 volt can be applied to the base of transistor 14 to turn it on, coincident positive inputs must be present both at the base and collector of transistor 22. Therefore, when the 1.2 volts from the emitter of transistor 18'' is applied through output line 24'' to the collector of transistor 22, there will not be 1 volt applied to the base of transistor 14 when a storage access request signal is present at terminal 74, since then the required coincidence will not be present at single transistor AND means 22.

At this point it should be noted how diodes or unidirectional current means 16, 16', 16'', 20, 20' and 20'' in the cross coupled feedback connections of flip-flops 10, 10' and 10'' insure that the setting of the flip-flops 10, 10' and 10'' will be unambiguous when the storage access request signal halts the scanner. For instance, if the diode 20'' were not present when the +1 volt was applied to the base of transistor 11'' to turn it on and thereby generate the +1.2 volts output at the emitter of 18'', the +1.0 volt at the base of transistor 11 would be bypassed immediately to the collector of transistor 22 without waiting for the appearance of the 1.2 volts at the emitter of 18''. As can be seen, this would cause utter chaos within the scanner operation within short order, thereby rendering the status of the scanner completely ambiguous when an attempt was made to resolve the status of the scanner.

In order to more fully understand how the resolver acts in combination with the scanner to establish the connection of the requesting remote station to the storage module, reference should now be made to FIGURES 2 and 3. FIGURE 2 shows the logic diagram for the scanner while FIGURE 3 shows the logic diagram for the resolver circuit. Flip-flop circuits 10, 10' and 10'' are divided into two inverter means 78 and 80, 78' and 80', and 78'' and 80'', respectively. The output terminals 34 and 36, 34' and 36', and 34'' and 36'', respectively, are shown as are also diodes 20 and 16, 20' and 16', and 20'' and 16'', respectively. Further, the single transistor AND means 26 and 22, 26' and 22', and 26'' and 22'', respectively, are also shown. The inputs to the flip-flops correspond to the base terminals of transistors 11, 11', 11'', 14, 14' and 14'', respectively. The operation of the scanning of the scanner of FIGURE 2 is identical with that of FIGURE 1 and needs no further discussion. It should be noted however that each of the invertor means of the scanner corresponds to a unique remote station. In other words, remote station No. 0 corresponds to invertor means 80, remote station No. 1 corresponds to invertor means 80′, and so forth.

Suppose that remote station No. 1 requests access to the storage module by applying a positive pulse to terminal 74′, which would be inverted by invertor 62′ to render the AND means 22′ inoperative. The situation at each of the output terminals 34 and 36, 34′ and 36′, 34″ and 36″ will be as follows: terminal 36 will be at +1.2 volts or at logic level ONE, and the voltage at terminal 36′ will be +.2 volt or logic level ZERO, the output at terminal 36″ will be ZERO, the output at terminal 34 will be ZERO. The output at terminal 34′ will be ONE and the output at terminal 34″ will be ONE. This particular configuration of the flip-flops of the scanner corresponds to a particular state of the scanner, which would be state No. 1, since it was assumed that remote station No. 1 caused the scanner to halt.

In order to uniquely determine which of M remote stations the above described state of the scanner corresponds to, it is required to sample or look at the output associated with the invertor means corresponding to the remote station that has requested storage access and the output associated with the invertor means which corresponds to the remote station having a number associated therewith which is $$\frac{M}{2}-1$$

greater than the number associated with the remote station making the request for storage access. In other words, referring to the above setting of the scanner when it is halted by a request from remote station number 1 of 6 remote stations, the outputs from terminals 36′ and 34 will uniquely determine that the scanner has decided that remote station number 1 is requesting storage access since the outputs from output No. 1 and output No. 3 are the only two outputs that will both be ZERO and that do not immediately follow one another when the scanner stops at state No. 1.

For a fuller understanding of the above resolving action, reference should now be made to FIGURE 3 which shows the logic diagrams of the resolver network. The resolver for remote station No. 0 is connected to the terminals 36 and 36″ of the scanner of FIGURE 2. The resolver for remote station number 1 is connected to the outputs 36′ and 34 of FIGURE 2 and so fourth. The terminal 82 connected to each of the resolvers provides a memory busy signal which prevents the resolver from completing a connection between a requesting remote station and the storage module until the memory or storage module becomes unbusy. Three input negative AND gates 84–90 are provided to receive the inputs from the scanner and the memory busy input. A delay circuit or means 86 is provided at the output of each AND gate to insure that the scanner has indeed halted before a connection is made to the storage module from the requesting remote station. A threshold device 88 is provided at the output of the delaying means to provide the signal which controls the connection of the remote station to the storage module. The threshold device 88 is actuated only after the signal at the output of the delaying means 86 has risen to a level which exceeds the threshold of threshold device 88.

Assuming that a request has been made from remote station No. 1 for access to the storage module, the output at terminals 36′ and 34 of FIGURE 2 will be logical ZERO's, as has been noted before. Assuming further that the memory is unbusy, the signal at terminal 82 will also be logical ZERO; and therefore, the output from negative AND gate 90 will rise to a logical ONE. Delay means 86 will prevent this logical ONE from being applied to threshold device 88 until a certain predetermined interval of time has been exceeded. At this time the threshold gate 88 will be actuated to provide the signal for controlling the connection between remote station No. 1 and the storage module.

Note that if a request were made from remote station No. 5 that the output terminals from the scanner which would uniquely determine that the scanner is in state No. 5 and therefore would provide the proper voltage levels to actuate negative AND gate 114 would be terminal 34″ and terminal 36. No other pair of output terminals would uniquely provide two logical ZERO's to any of the negative AND gates 84, 90, 96, 102, 108 and 114. Therefore, the choice of the output associated with the invertor means 78″ corresponding to remote station number 5 and the output associated with the invertor means 80′ which corresponds to remote station number 1 will provide the desired inputs to uniquely determine the state of the scanner.

Broadly then, if there are M remote stations and the Nth remote station makes a request for access to the storage module, the resolver corresponding to the Nth station must be connected to the Nth and $$N+\frac{M}{2}-1$$

outputs of the scanner.

Further, the single transistor AND means 22 is, broadly speaking, responsive to the output from the $N$th−1 output and the storage access request signal from the Nth remote station to halt the scanner at the Nth state.

Reference should now be made to FIGURE 4 for a detailed description of the scanner state resolver for a typical system where $M=6$. Transistors 120, 122 and 124 are provided to receive the outputs from scanner output number N, scanner output number $N+2$, and the memory clear or unbusy input signal, respectively. When logical ZERO's are at all three inputs to the negative AND gate comprising transistors 120, 122 and 124, a positive 1.2 volts output occurs at the emitter of transistor 126. This voltage wave form is integrated by the resistor 128 and the condenser 130. When this integrated voltage reaches 0.8 volt at the base of transistor 132, the collector of transistor 132 goes to ground and remains there as long as the scanner is located in state N.

This is shown in FIGURE 5 where the wave forms associated with the combination scanner and resolver are illustrated. Wave form A shows an inhibit signal from remote station N which causes scanner output number N to fall to logical ZERO as shown in wave form B. A short time thereafter the scanner output number $N+2$, as shown at wave form C, will also fall to logical ZERO. At wave form D is shown the output which will occur from resolver number N, assuming that the memory clear output is also at logical ZERO. Note that the total amount of time required for the inhibit signal number N to reduce both the scanner outputs number N and number $N+2$ to the logical level ZERO is given as the time $t_1$ and the amount of time for the resolver to react to the logical ZERO's at its input is given by the time $t_2$. The time $t_3$ gives the total amount of time necessary for the resolver output control signal to cause the disconnection of the remote station N from the storage module after the requesting signal from the remote station number N has been removed from the scanner.

Having described the basic elements of the scanner state resolver of FIGURE 4 (that is, transistors 120, 122, 124, 126 and 132, and resistor 128 and condenser 130), the other elements of the resolver will now be listed. DC source 133, resistor 134 and the biasing network comprising diodes 135 and 137, DC source 136, condenser 138 and resistor 140 provide the proper operating voltages for transistors 120, 122 and 124 along with the load resistor 142 and DC source 143. The load resistor 144 for emitter follower 126 is connected to DC source 145. The load resistor 146 for transistor 132 is connected to DC source 147. Resistor 148, diode 149 and resistor 150 comprise the output network for the resolver.

Although the illustrated embodiment of the resolver means has been connected to the Nth and $N$th+2 outputs of the scanner, it is also possible to employ the Nth, $N$th+1, and $N$th+2 outputs concurrently to provide the input condition to the resolving means necessary to resolve the scanner state when M is 6. In other cases the N, $N+1$, and $$N+\frac{M}{2}-1$$

outputs may be used. Also, a positive AND gates may be provided with the resolving means in place of the negative AND gate shown in the illustrated embodiment when different voltage levels are employed or when the other invertors of corresponding flip-flops are used, rather than those as described hereinbefore. $N$th+5, modulo M, outputs or the $N$th+3, $N$th+4, and $N$th+5, modulo M, outputs to uniquely resolve the scanner state.

Reset transistors 51, 51′ and 51″ provide a capability for resetting the scanner after a storage access request signal has been satisfied by the storage module. Once the request from a given remote station is satisfied, a reset signal will be generated which will occur simultaneously at the control terminals 53, 53′ and 53″ to reset flip-flops 10, 10′ and 10″ such that the scanner resets state No. 0, which for this example corresponds to preferred remote station No. 0. When the scanner resumes its free-running operation after the given remote station has been satisfied, remote station No. 0 will be scanned first to determine if it is requesting access to the storage module and therefore station No. 0 would be considered the preferred station in this example.

The action of the reset pulses on reset transistors 51, 51′ and 51″ is such that the voltage at the collector of transistor 51, for example, will be one volt due to the voltage drop in resistor 42 since transistor 51 is turned on. The voltage at the emitter of transistor 12 will be .2 volt due to the .8 volt drop across the base emitter junction of transistor 12. Therefore, the voltage at the base of transistor 14 will be —.4 volt due to the 6 volt drop across diode 16, the —.4 volt at the base of transistor 14 being sufficient to maintain transistor 14 in the cut-off condition. Corresponding action will take place in the flip-flops 10′ and 10″ therefore resetting the scanner to state No. 0.

The resetting feature as described above is optional and it is possible to operate the scanner and resolver combination without this reset feature, thereby removing the transistors 51, 51′ and 51″ from the scanner. When the scanner operates in this mode of operation, there is no preferred remote station and the scanner continuously cycles through its states without reverting to a preferred state. For example, if the scanner were halted at station No. 3 by a storage access request from remote station No. 3, the next remote station that would be scanned after the request from station No. 3 has been satisfied would be station No. 4. There would be no resetting of the scanner to state No. 0, for instance. In this mode of operation, no one remote station is given preference over the other and, therefore, the scanner is said to respond to the requests from the remote stations in a predetermined sequence.

Scanner and resolver combinations were assembled using Motorola SF2513 type transistors and Raytheon 2N2808 transistors. With the Motorola transistors in the scanner, minimum time from the input to the invertor driver 62, for example, to the output of the resolver was 16.0 nanoseconds, this being the total time $t_1+t_2$ shown in FIGURE 4. The maximum time measured was 31.5 nanoseconds. Therefore, the total time for a scanner cycle was 15.5 nanoseconds. This testing was done without the reset transistors incorporated into the scanner. With the Raytheon transistors in the scanner and resolver combination, in place of the Motorola transistors, the minimum time from the input of the invertor driver 62, for example, to the output of the resolver was 14.0 nanoseconds. The maximum resolve time was 26.0 nanoseconds. Therefore, the cycle time was 12.0 nanoseconds.

The test curves of the scanner and resolver combination show that the voltage margins of the units will operate for worse case supply variations of greater than ±15% on all supplies. The scanner and resolver combinations were also checked in the temperature range from 0 to 100 C. They operated over the full range, but the scanner cycle time increased by 33% at 100 C.

Thus, there has been described a scanner and resolver combination which is simply constructed of three flip-flops 10, 10′ and 10″, six switches, 62, 62′, 62″, 72, 72′, 72″, six gates 84, 90, 96, 102, 108 and 114 and six integrators 86 (as shown in FIGURE 3). This scanner and resolver combination is fast enough to perform without other speed-up circuitry. This will greatly reduce the complexity of scanner and resolver combinations resulting in lower costs and less time for check-out.

A further feature of the scanner and resolver combination is its ability to output on two channels if two or more simultaneous requests have the proper relative timing. In trying to force failures, the rate of failures is approximately one per several million simultaneous requests. For computer use, this incidence of failures is too high.

There are two ways to avoid this high failure rate:

(1) The delay in the resolver may be increased by increasing the capacitance 130. In the following table of values for a typical embodiment of the scanner and resolver combination, the value of capacitor 130 is given as 22 pf. However, to insure that the scanner has settled into a stable state, and thereby avoid the high failure rate, the delay of the resolver is lengthened by increasing the capacitance of capacitor 130 to 100 pf.

(2) The Nth, $N$th+1 and $N$th+2 outputs are used to drive the AND gate at the resolver input, as described before; and, therefore, the resolver will not provide an output control signal until all scanner flip-flops have reached a stable state.

With the above features incorporated into the scanner, thereby insuring high reliability, the minimum time from input to the inverter driver 62, for example, to the output of the resolver was 20 nanoseconds, the maximum time was 42 nanoseconds, and the scanner cycle time was approximately 22 nanoseconds. These times were measured using Motorola SF2513 type transistors. No failures were noted for six hours of operation with simultaneous requests present.

Given below is a table of illustrative values of components used in a working embodiment of the invention as described in the accompanying figures. These values are given for the purposes of illustrating a working embodiment, and there is no intent to restrict the invention to the values given below.

| Component: | Value |
|---|---|
| All transistors | Either Raytheon 2N2808 or Motorola SF2513 or CDC245582. |
| All diodes | Type 1032. |
| Resistors **30**, **32** | 1000Ω. |
| Resistors **38**, **40** | 2000Ω. |
| Resistors **42**, **44** | 180Ω. |
| Resistor **46** | 1000Ω. |
| DC source **48** | 2.1 volts. |
| DC source **50** | —6 volts. |
| DC source **52** | +6 volts. |
| Resistors **54**, **64** | 680Ω. |
| Resistors **58**, **68** | 1000Ω. |
| Condensers **60**, **70** | 100 pf. |
| Resistors **73**, **75** | 150Ω. |
| Resistor **128** | 180Ω. |
| Condenser **130** | 22 pf. |
| Resistor **134** | 1000Ω. |
| DC supply **136** | 2.1 volts. |

| Component: | Value |
|---|---|
| Condenser 138 | 4000 pf. |
| Resistor 140 | 180Ω. |
| Resistor 142 | 180Ω. |
| Resistor 144 | 1000Ω. |
| Resistor 146 | 470Ω. |
| Resistor 148 | 120Ω. |
| Resistor 150 | 56Ω. |
| DC source 133 | −6 volts. |
| DC source 143 | 2.1 volts. |
| DC source 145 | −6 volts. |
| DC source 147 | +6 volts. |

Although the various embodiments of the invention have been described in terms of specific voltage levels to illustrate a particular working embodiment, there is no intent to restrict the invention to these particular voltage levels. Further NPN transistors have been used throughout the figures of the drawing and once again these are used only for illustrative purposes and the use of PNP transistors is possible after appropriately adjusting the supply voltages and biasing resistors.

While the invention has been described with reference to the preferred forms thereof, it will be understood by those skilled in the art after understanding the invention that modifications may be made therein without departing from the spirit and scope of the invention.

I claim:

1. A device for connecting one of a plurality of remote stations to a storage module in response to a storage access request signal from said one station comprising means for scanning said remote stations to determine which one of said stations is requesting access to said storage module, means responsive to said scanning means for resolving which remote station the scanning means determined was requesting access to said storage module, and means rendering the resolving means unambiguous.

2. A device as in claim 1 where said scanning means can exist in a plurality of states equal in number to said remote stations where each state corresponds to a unique remote station respectively, said device including means responsive to said storage access request signal for halting said scanner at the state corresponding to said unique remote station when there is an access request from said unique remote station.

3. A device as in claim 2 where said scanning means includes a plurality of flip-flop circuits having cross-coupled feedback connections, said flip-flop circuits being inter-connected for free running operation, and where said means for rendering said resolving means unambiguous includes unidirectional current means in said cross-coupled feedback circuits.

4. A device as in claim 3 where said halting means includes a single transistor AND means responsive to said storage access request signal for halting said scanner.

5. A scanner device for determining which one of a plurality of remote stations should be connected to a storage module in response to a storage access request signal from said one remote station comprising a plurality of flip-flops having a plurality of outputs interconnected for free running operation;

means for providing a storage access request signal from said remote station; and single transistor AND means interposed between respective outputs of said interconnected flip-flops and respective ones of said signal providing means and responsive to one of said outputs and said storage access request signal for halting said scanner.

6. A scanner and resolver combination for determining which one of a plurality of remote stations should be connected to a storage module in response to a storage access request signal from said one remote station comprising a plurality of flip-flop circuits interconnected for free running operation, said flip-flop circuits having cross-coupled feedback circuits connecting a pair of inverter means, said scanner having a plurality of outputs and a plurality of states equal in number to the number of remote stations, each state corresponding to a unique remote station respectively;

halting means included in said scanner responsive to the coincident occurrence of one of said outputs and said storage access request signal for halting said free running scanner at the state corresponding to said one station;

resolver means responsive to at least two of said outputs for resolving which state the scanner was halted and unidirectional current means included within said cross coupled feedback connections for insuring that the state which the resolver means is responsive to is unambiguous.

7. A device as set forth in claim 6 including means for resetting said scanning means to a preferred state corresponding to a preferred remote station after a storage access request has been satisfied.

References Cited

UNITED STATES PATENTS

| | | | |
|---|---|---|---|
| 2,825,889 | 3/1958 | Henle | 340—16 |
| 3,183,365 | 5/1965 | Ligotky | 307—88. |

OTHER REFERENCES

German printed application S.N. 1,158,109, Nov. 28, 1963, class 307, subclass 88.5/9.5.

DONALD J. YUSKO, *Primary Examiner.*